(12) United States Patent
Hartman et al.

(10) Patent No.: US 6,206,021 B1
(45) Date of Patent: Mar. 27, 2001

(54) SLEEVE VALVE WITH CLEAN OUT SECTION

(76) Inventors: Thomas A. Hartman, 700 Capac Ct., St. Louis, MO (US) 63125; Brian T. Hartman, 2253 E. Contessa Cir., Mesa, AZ (US) 85213

( * ) Notice: Subject to any disclaimer, the term of this patent is extended or adjusted under 35 U.S.C. 154(b) by 0 days.

(21) Appl. No.: 09/516,674

(22) Filed: Mar. 1, 2000

(51) Int. Cl.$^7$ .............................. F16K 11/06; B08B 9/03; B08B 9/04; B08B 1/02; B08B 3/04
(52) U.S. Cl. .................................. 137/15.06; 137/15.07; 137/240; 137/245.5; 137/546; 137/549; 137/599.14; 137/625.3; 137/625.38; 137/625.39; 251/121; 251/205; 251/210
(58) Field of Search .............................. 137/15.01, 15.04, 137/15.05, 15.06, 15.07, 238, 239, 240, 625.3, 625.33, 625.37, 625.38, 625.39, 599.01, 599.14, 544, 546, 549, 245.5; 134/166 C; 15/104.16; 251/121, 205, 210; 210/428, 429, 430, 432; 222/189.06, 189.11

(56) References Cited

U.S. PATENT DOCUMENTS

| | | | |
|---|---|---|---|
| 3,990,475 | * 11/1976 | Myers | 137/625.3 |
| 4,036,248 | * 7/1977 | Yoshimori et al. | 137/625.38 |
| 4,040,443 | * 8/1977 | Okada et al. | 137/625.38 |
| 4,375,821 | * 3/1983 | Nanao | 137/239 |
| 4,397,331 | * 8/1983 | Medlar | 137/625.38 |
| 4,508,138 | * 4/1985 | Dixon | 137/625.39 |
| 5,950,660 | 9/1999 | Hartman et al. | 137/219 |

* cited by examiner

Primary Examiner—George L. Walton
(74) Attorney, Agent, or Firm—Howell & Haferkamp, LC

(57) ABSTRACT

A sleeve valve comprises a sleeve and a gate. The sleeve includes an intake, a discharge nozzle section, and a clean-out section. The discharge nozzle section includes a plurality of nozzles. The sleeve is adapted for fluid flow from the intake through a fluid passage and out the nozzles. The clean-out section includes at least one access port. The gate is adapted for sliding within the sleeve in sliding sealing engagement with the interior surface of the sleeve between closed, throttling, open, and clean positions. The gate and sleeve are configured so that the gate, when in the closed position, prevents fluid within the fluid passage from flowing out the nozzles and the access port. The gate and sleeve, when in the throttling position, permits fluid within the fluid passage to flow out some of the nozzles but prevents fluid within the fluid passage from flowing out the access port of the clean-out section and others of the nozzles. When in the open position, fluid is permitted to flow out the nozzles but not out the access port. When the gate is in the clean position, fluid within the fluid passage may flow out the nozzles and out the access port. The clean-out section is adapted so that debris which is too large to fit through the nozzles of the discharge nozzle section may be removed via the access port of the clean-out section.

21 Claims, 5 Drawing Sheets

SLEEVE VALVE WITH CLEAN OUT SECTION

BACKGROUND OF THE INVENTION

This invention relates generally to large industrial flow control valves, and more particularly, to multi-jet sleeve valves.

Conventional sleeve valves have been employed to control the flow rate and head pressure of fluids in industrial piping systems. Sleeve valves are often chosen because of their ability to reduce head pressure and control flow rates without creating significant cavitation which can cause excessive noise and premature wear of valve components.

A conventional downflow sleeve valve has a vertically-oriented, generally cylindrical sleeve, and a gate adapted for sliding within the cylindrical sleeve. The sleeve includes an intake coupled to a fluid supply line. The sleeve further includes a discharge nozzle section. The nozzle section is a generally cylindrical tube having a plurality of diverging nozzles arranged in a pattern about a longitudinal axis of the sleeve. The bottom of the sleeve is connected to a base pan that is mounted to the inside bottom of a tank or stilling well. The base pan is a generally cylindrical tube connected at its upper end to the sleeve. Its lower end is closed by a disc-shaped plate welded thereto. A drain pipe extends radially from the base pan and is connected to a drain valve to discharge fluid from the sleeve.

The sleeve valve is operated by axial movement of the gate positioned within the sleeve. The gate is generally cylindrical in shape and has exterior annular channels adjacent its upper and lower ends, and annular seals within the channels. The seals are adapted for sliding sealing engagement with the interior of the sleeve. The gate includes an internal fluid passageway therethrough extending from its upper end to its lower end. The passageway reduces head pressure from fluid upstream of the gate by permitting fluid to flow through the passageway. In other words, when the gate is moved axially upwardly (i.e., upstream), then fluid within the piping system flows through the passageway of the gate such that no significant axial force is exerted on the gate due to head pressure. An actuating stem extends vertically upwardly from the gate and extends through the piping system. Up and down movement of the stem causes up and down movement of the gate. The gate is moveable between open and closed positions. In its closed position, all of the nozzles of the nozzle section are axially between the seals of the gate. The seals seal against fluid flowing from the piping system out the nozzles. In the open position, the gate is positioned such that both of the annular seals of the gate are positioned axially below the nozzles so that fluid flowing downward into the sleeve flows laterally outwardly through the nozzles. The gate may also be positioned somewhat between the open and closed positions to control the rate of fluid flow through the nozzle section. In other words the gate may be positioned so that the upper seal of the gate is below some of the nozzles and positioned above the rest of the nozzles so that fluid flows out only some of the nozzles. To increase fluid flow, the gate is raised (i.e. moved upstream); to decrease fluid flow, the gate is lowered (i.e. moved downstream).

Occasionally, debris accumulates within the gate or in the sleeve valve. The debris is usually larger than the openings of the nozzles and therefore does not flow out the nozzles. The debris may negatively affect the performance of the valve or the flow rate through the piping system and therefore must be removed. A disadvantage of prior art sleeve valves is that the valve must be disassembled to remove the debris. Disassembly of the valve results in considerable effort, cost and downtime.

SUMMARY OF THE INVENTION

Among the advantages of the present invention may be noted the provision of an improved sleeve valve which is capable of having debris removed therefrom without disassembling the valve, and the provision of a method of removing debris from a sleeve valve without disassembling the valve.

In general, a sleeve valve of the present invention comprises a sleeve and a gate. The sleeve has an interior surface defining an internal fluid passage. The sleeve includes an intake, a discharge nozzle section, and a clean-out section. The internal fluid passage extends downstream from the intake to at least the discharge nozzle section. The discharge nozzle section includes a plurality of nozzles. The sleeve is adapted for fluid flow from the intake through the fluid passage and out the nozzles of the discharge nozzle. The clean-out section includes at least one access port. The gate is adapted for sliding within the sleeve in sliding sealing engagement with the interior surface of the sleeve between closed, throttling, open, and clean positions. The gate and sleeve are configured and adapted so that the gate, when in the closed position, prevents fluid within the fluid passage from flowing out the nozzles and the access port. The gate and sleeve are configured and adapted so that the gate, when in the throttling position, permits fluid within the fluid passage to flow out some of the nozzles but prevents fluid within the fluid passage from flowing out the access port of the clean-out section and others of the nozzles. The gate and sleeve are also configured and adapted so that the gate, when in the open position, permits fluid within the fluid passage to flow out the nozzles but prevents fluid within the fluid passage from flowing out the access port of the clean-out section. The gate and sleeve are further configured and adapted so that the gate, when in the clean position, permits fluid within the fluid passage to flow out the nozzles and out the access port. The clean-out section is adapted so that debris which is too large to fit through the nozzles of the discharge nozzle section may be removed via the access port of the clean-out section.

Another aspect of the present invention is a method of cleaning a sleeve valve by flushing fluid through the valve. The method comprises moving the gate to the clean position to permit fluid to flow through the access port of the clean out section in a manner to flush debris which is too large to fit through the nozzles of the discharge nozzle section out the access port.

Another aspect of the present invention is a method of clearing debris from a sleeve valve by extracting debris from the valve. The method comprises stopping fluid flow into the intake of the sleeve to prevent fluid from flowing from the fluid passage out the access port of the clean-out section even when the gate is in the clean position, moving the gate to the clean position, and extracting debris (which is adjacent the gate) out the access port.

Other features and advantages will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
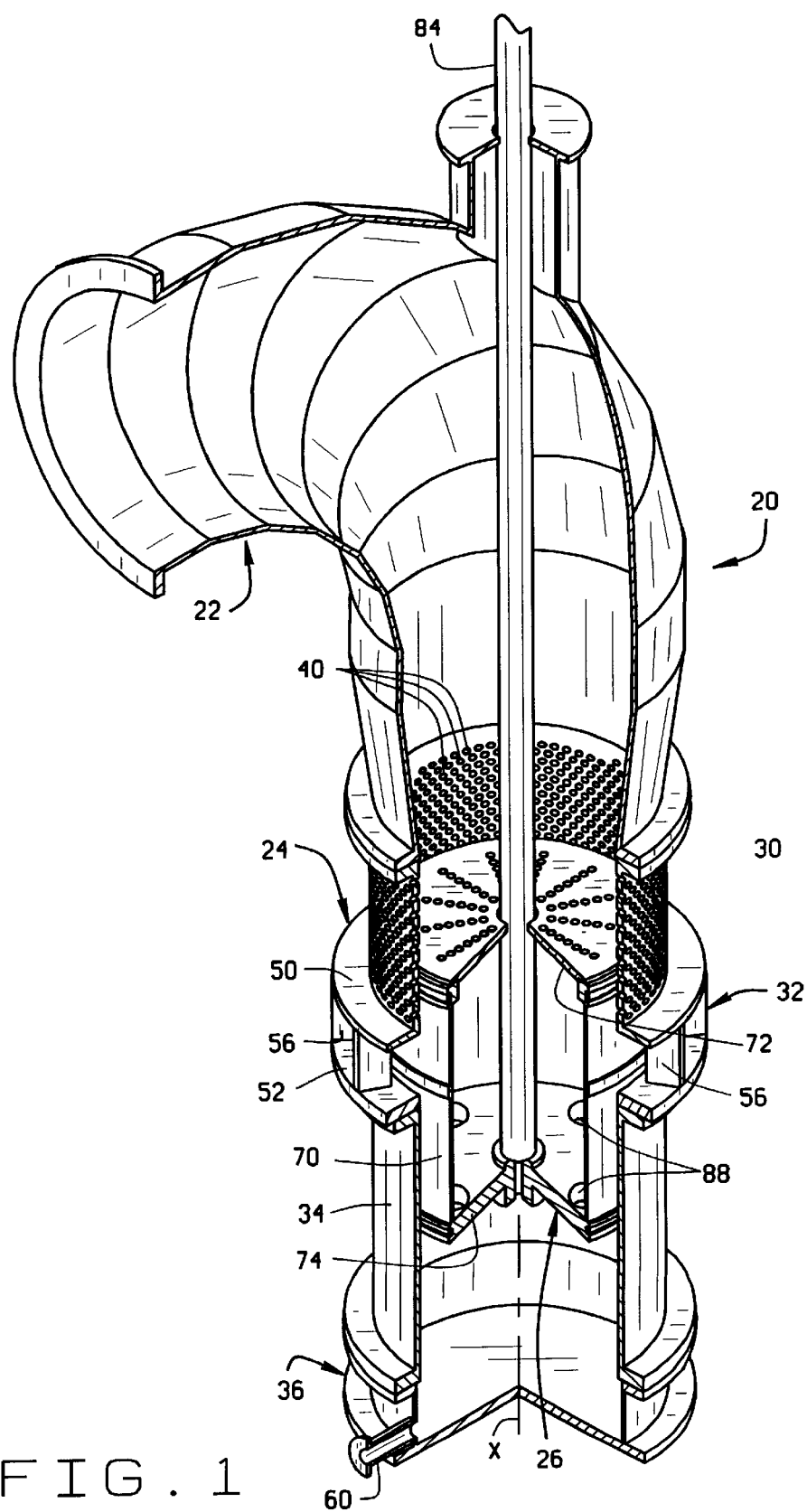
FIG. 1 is a fragmented perspective view of a sleeve valve of the present invention as part of a fluid system, the sleeve valve having a sleeve and a gate moveable therein, the sleeve including a discharge nozzle section and a clean-out section.

Referring now to the drawings, and first more particularly to FIG. 1, a sleeve valve of the present invention is indicated in its entirety by the reference numeral 20. The sleeve valve 20 is adapted to be connected to a fluid system, such as water supply system. Preferably, the sleeve valve 20 is in a tank or stilling well (not shown), and is adapted to be connected to a fluid supply line (not shown). The purpose of the sleeve valve 20 is to regulate flow rate of fluid from the fluid supply line into the tank.

Figure 2:
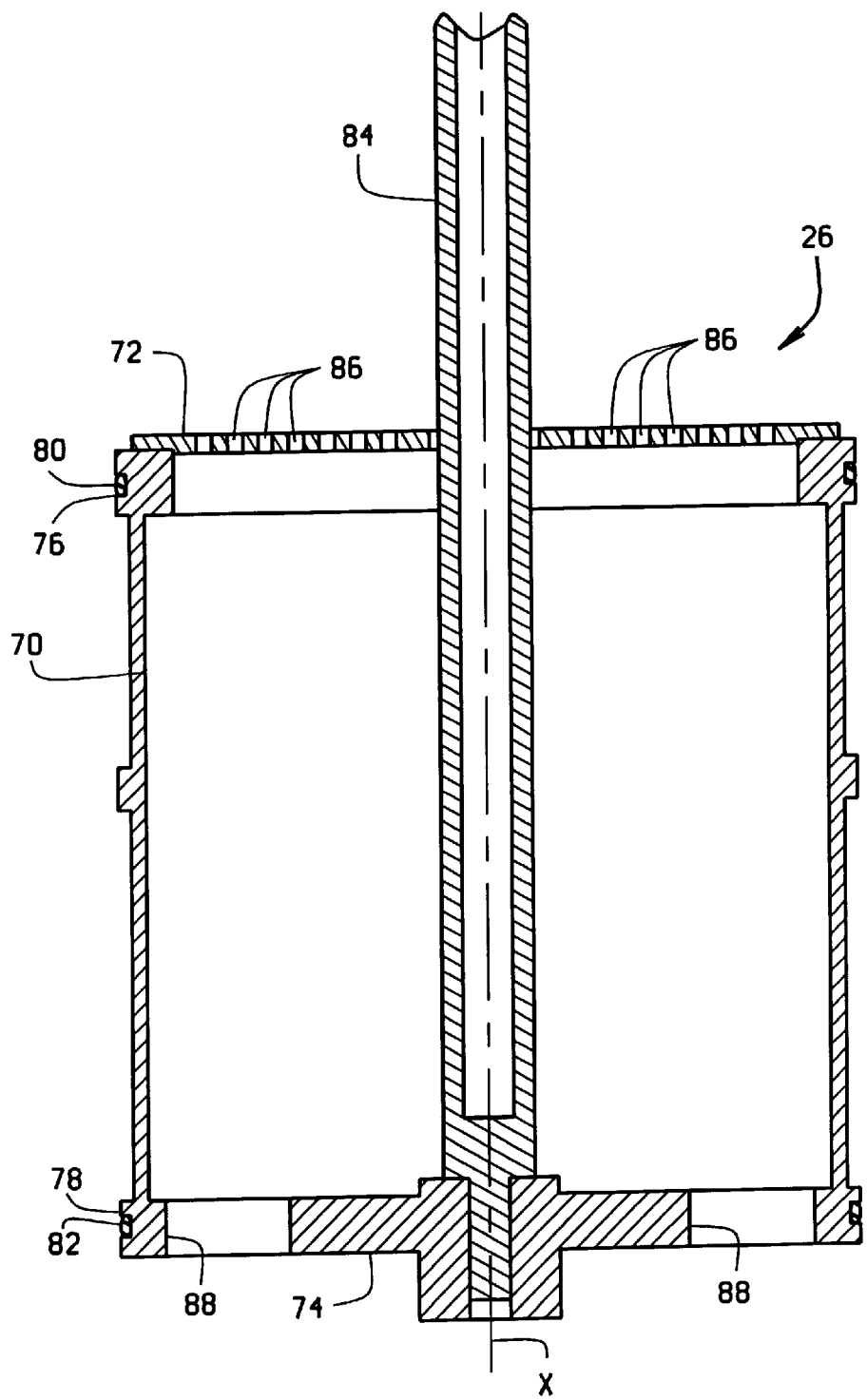
FIG. 2 is an enlarged, longitudinal sectional view of the gate of the sleeve valve of FIG. 1.
Figure 3:
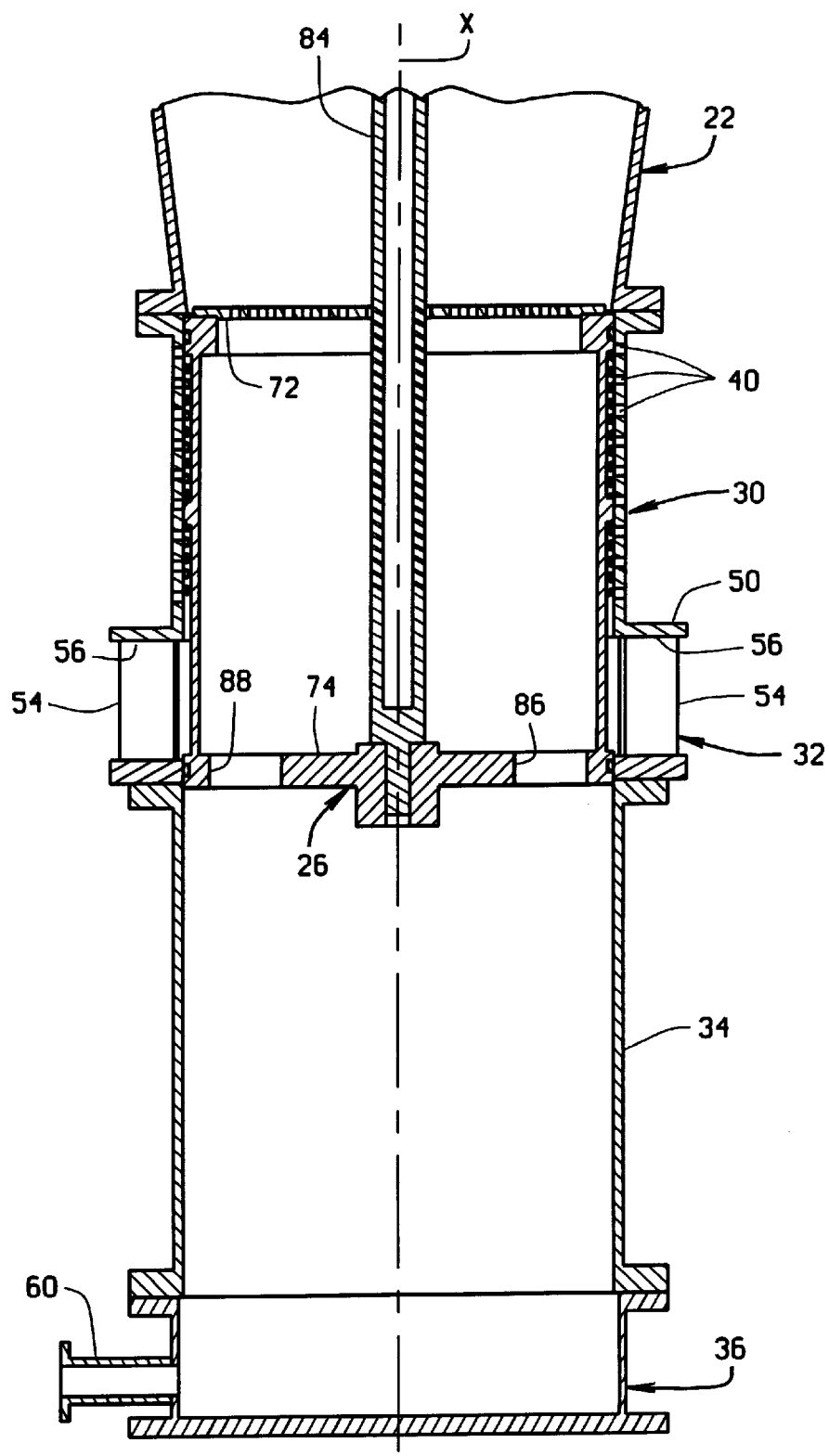
FIG. 3 is a fragmented, longitudinal sectional view of the sleeve valve of FIG. 1, the gate being in a closed position to prevent fluid in the piping system from flowing out discharge nozzle section and the clean-out section.

The sleeve valve 20 comprises a reducing elbow, generally indicated at 22, a sleeve, generally indicated at 24, and a gate, generally indicated at 26. The reducing elbow 22 is adapted to connect the fluid supply line to the sleeve 24 in a manner so that fluid from the fluid supply line flows into the sleeve. The sleeve 24 comprises a discharge nozzle section 30, a clean-out section 32, a lower sleeve section 34, and a base pan 36. The nozzle section 30, clean-out section 32, and lower sleeve section 34 all have generally cylindrical-shaped inner surface portions of substantially uniform diameter and are stacked one on top of the other in a coaxial arrangement to form a sleeve interior surface adapted for receiving the gate 26. The inner surfaces of the elbow 22 and sleeve 24 define an internal fluid passage for passage of fluid from the fluid supply line downstream through the sleeve and out the nozzle section 30 and clean-out section. The gate 26 (FIGS. 1 and 2) is shaped and configured for sliding along a central, longitudinal axis X of the sleeve interior surface and within the discharge nozzle section 30, clean-out section 32 and lower sleeve section 34, in sliding sealing engagement with the interior surface of the sleeve between closed, throttling, open, and clean positions. As discussed in greater detail below, the closed position is shown in FIG. 3, the open position is shown in FIG. 4, the clean position is shown in FIG. 5, and the throttling position is shown in FIG. 1.

Figure 4:
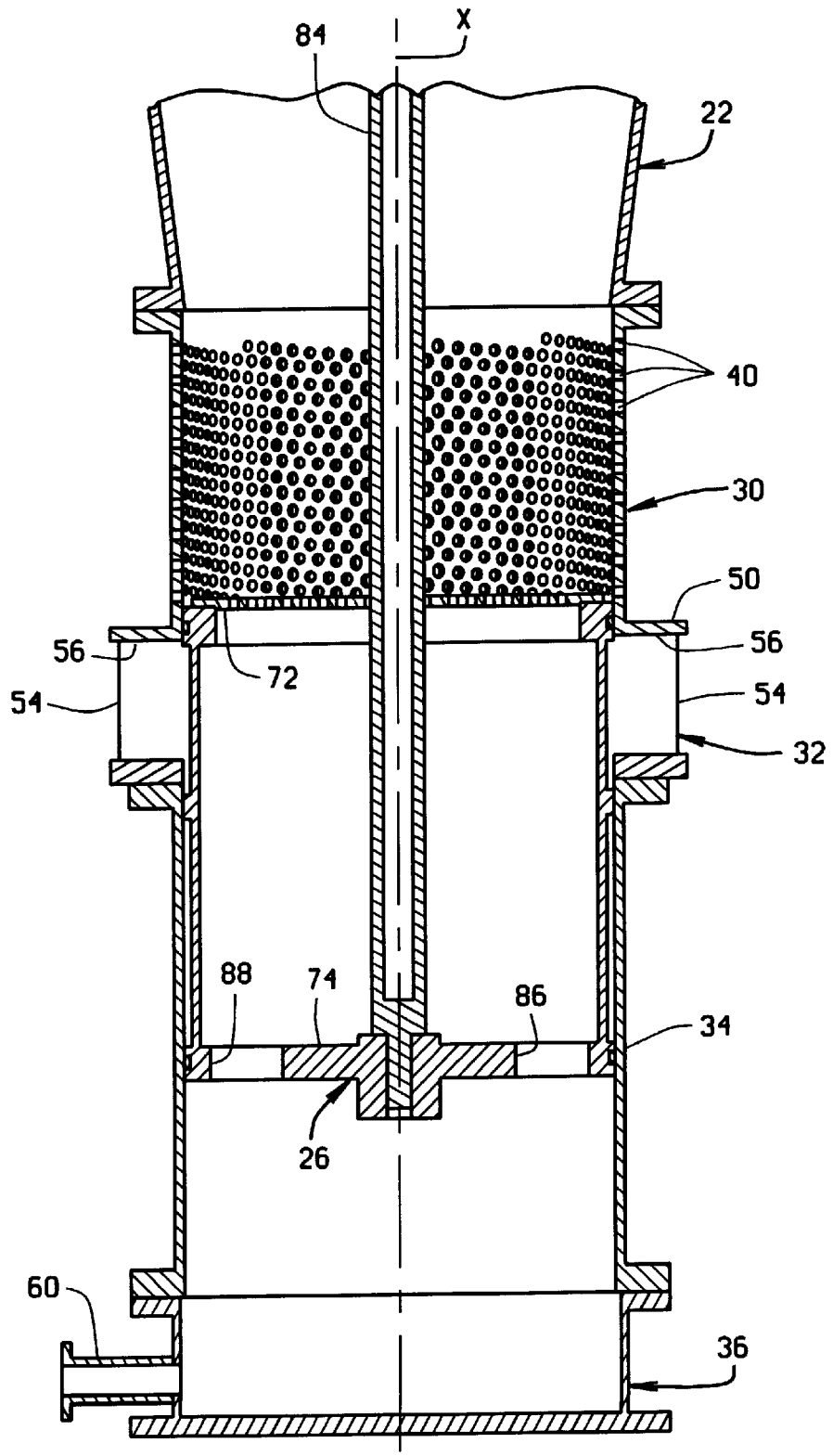
FIG. 4 is a fragmented, longitudinal sectional view similar to that of FIG. 3 but showing the gate in an open position in which the gate is positioned to permit fluid to flow through discharge nozzles of the discharge nozzle section, but block fluid flow out the clean-out section.
Figure 5:
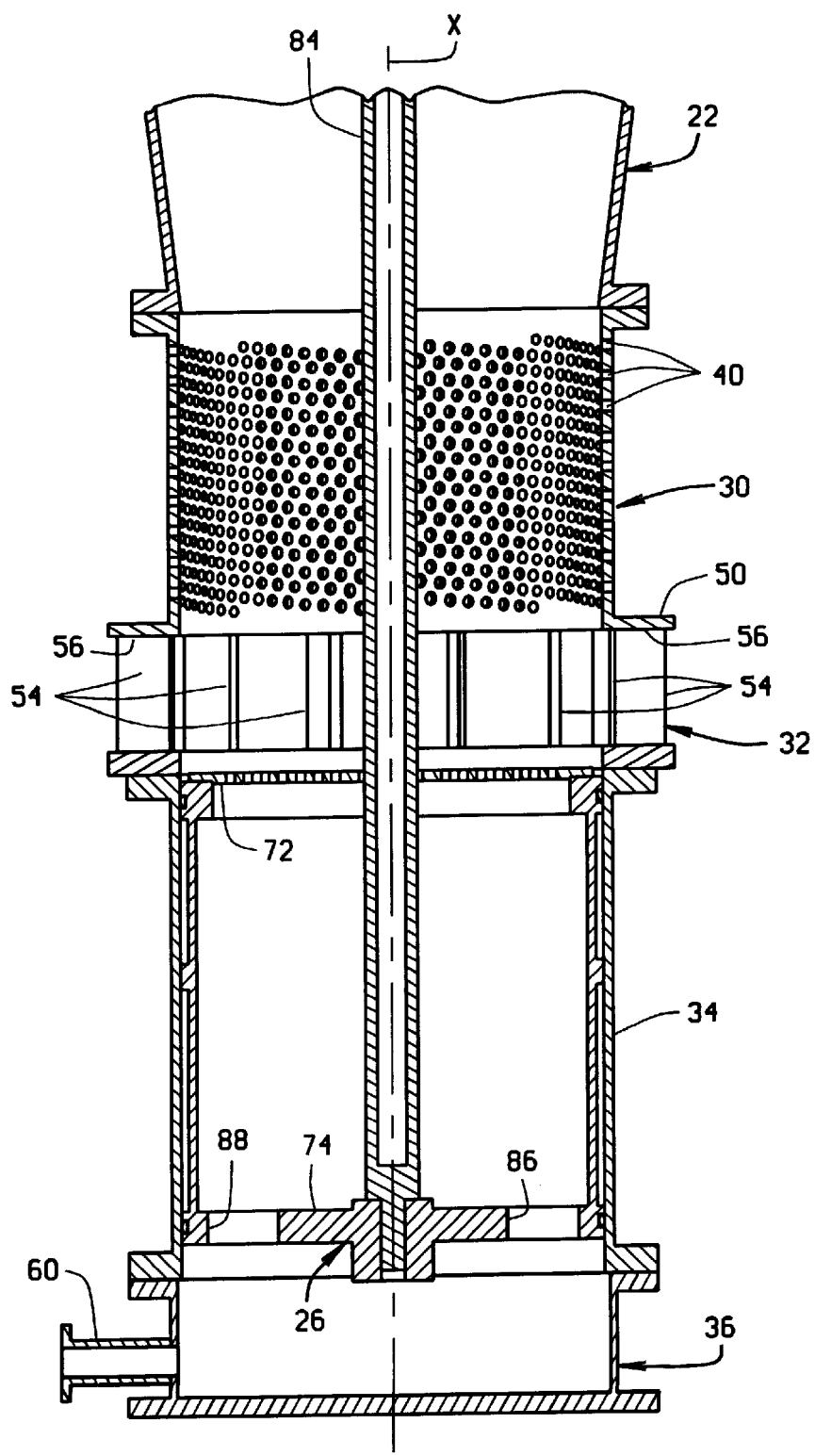
FIG. 5 is a fragmented, longitudinal sectional view similar to that of FIGS. 3 and 4 but showing the gate in a clean position in which the gate is positioned axially below the clean-out section to permit fluid to flow through the discharge nozzles and through the clean-out section.

The discharge nozzle section 30 including a plurality of nozzles 40, preferably arranged in a helical pattern (see FIGS. 4 and 5). Each nozzle 40 preferably includes an inlet adjacent the interior surface of the nozzle section 30 and an outlet adjacent the external surface of the nozzle section. Preferably the nozzles 40 diverge from the inlets to the outlets. In this embodiment, the internal diameter of the sleeve 24 is approximately 48" and the discharge nozzle section 30 has more than 1200 nozzles. However, it is to be understood that larger or smaller sleeves may be employed and more or fewer nozzles may be included without departing from the scope of this invention. Also, the inlets and outlets are preferably circular with each outlet having a diameter of approximately ½" to 1 ½' and with each outlet being less than approximately 3 in². However, it is to be understood that nozzles of different shapes and sizes may be employed without departing from the scope of the invention.

The clean-out section 32 is connected to the underside of the discharge nozzle section 30. It includes spaced upper and lower circumferential flanges 50, 52 and a plurality (e.g. sixteen) of vanes 54 extending vertically between the upper and lower flanges and having generally planar faces. The vanes 54 and flanges 50, 52 define access ports 56 through which fluid within the sleeve 24 may be discharged and through which a user may access the inside of the sleeve valve 20 without disassembling the valve. The access ports 56 are shaped and sized to permit a user to reach his or her hands and arms through the access ports and into the interior of the sleeve 24 and pull out debris therethrough. The access ports 56 also should be sufficiently large to enable the user to reach tools (e.g., saws, cutting torches, etc.) through the access ports to break up pieces of debris that are otherwise too large to be removed via the access ports. In the present embodiment, each access port 56 is approximately fourteen inches high and twelve inches wide, but access ports of other shapes and sizes may be used without departing from the scope of this invention. Preferably, the vanes 54 extend generally radially, but are canted slightly (e.g., 11.5° from radial) so that fluid discharged from the clean-out section 32 imparts a force against the vanes in a manner to impart a torsion force on the clean-out section.

The lower sleeve section 34 is a tubular-shaped section connected to the underside of the clean-out section 32. The lower sleeve section 34 enables the gate 26 to be lowered below the clean out section 32 so that the user may access the top portion of the gate via the access ports 56. Thus, the lower sleeve section 34 has an axial length (e.g., height as viewed in FIGS. 1 and 2–5) which is at least as great as the axial length of the gate 26. The base pan 36 is connected to the underside of the lower sleeve section 34 and has a closed bottom so that fluid flows into the tank via only the nozzles 40 and the access ports 56. A drain tube 60 extends from the base pan 36 to enable fluid to be drained from the lower sleeve section 34 and base pan.

The gate 26 comprises a cylindrical gate tube 70, a perforated upper end plate 72 closing an upper end of the gate tube, and a perforated lower end plate 74 closing a lower end of the gate tube. The outer surface of the gate tube 70 has upper and lower circumferential channels 76, 78 (FIG. 2) adjacent the upper and lower ends of the gate tube. Upper and lower ring-shaped seals 80, 82 are within the upper and lower channels 76, 78. The seals 80, 82 are preferably of a resilient, elastomeric material, and are adapted to engage the interior surface of the sleeve 24 in a sliding sealing engagement all around the circumference of the gate 26 in a manner to prevent fluid leakage between the gate and the interior surface of the sleeve. A central actuator stem 84 is fixed to the gate 26 and extends upward through an opening in the elbow 22 (FIG. 1). The upper end of the stem 84 is attached to a conventional actuator mechanism (not shown) adapted to raise and lower the stem to move the gate 26 in the sleeve 24 along the longitudinal axis X of the sleeve. The upper end plate 72 includes a plurality of through holes 86 and the lower end plate 74 includes a plurality of through holes 88. The holes 86, 88 and the hollow interior of the gate tube 70 constitute a fluid passageway extending through the gate from the first end to the second end. This fluid passageway permits fluid to flow through the gate 26 as the gate is raised and lowered to alleviate head pressure on the upper end plate 72 and thereby allows the gate to be raised without also having to raise a column of fluid within the sleeve 24.

As stated above, the gate 26 is moveable within the sleeve 24 between closed, throttling, open, and clean positions. The closed position is shown in FIG. 3. The axial distance between the upper and lower seals 80, 82 of the gate 26 is preferably sufficiently great so that all of the nozzles 40 and all of the access ports 56 are axially between the seals when the gate 26 is in its closed position. In such a position, the seals 80, 82 seal against leakage out the nozzles 40 and access ports 56. Stated another way, the upper and lower seals 80, 82 are spaced from each other an axial length which is at least as great as the sum of the axial lengths of the nozzle section and the clean-out section, i.e., as great as the distance between the upper most nozzle and the lower flange 52.

Referring now to FIG. 4, the gate 26 is shown in its open position. In the open position, the upper seal 80 is axially positioned between the lowermost nozzles 40 and the upper flange 50 of the clean-out section 32, and the lower seal 82 seals against the interior surface of the lower sleeve section 34. When in the open position, the gate 26 permits fluid within the fluid passage of the sleeve 24 to flow out the nozzles 40 but prevents fluid within the fluid passage from flowing out the access ports 56 of the clean-out section 30.

Fluid flow through the nozzle section 30 may be regulated between the closed position and open position by positioning the gate 26 so that the upper seal 80 is axially positioned below some of the nozzles 40 and positioned above the rest of the nozzles. Any such position of the gate 26 relative to the nozzle section 30 is referred to herein as a throttle position. When the gate 26 is in a throttle position (as shown in FIG. 1, for example), it permits fluid within the fluid passage to flow out some of the nozzles 40 (i.e., the nozzles above the upper seal 80) but prevents fluid within the fluid passage from flowing out the access ports 56 of the clean-out section 32 and others of the nozzles (i.e., the nozzles below the upper seal). The flow rate out the nozzle section 30 may be increased by lowering the gate 26 to provide fluid communication between more of the nozzles and the internal fluid passage, and may be reduced by raising the gate to provide fluid communication between fewer of the nozzles.

Referring now to FIG. 5, the gate 26 is shown in its clean position. In the clean position, the upper end plate 72 is positioned generally adjacent the lower flange 52 of the clean-out section 32. In the clean position, the gate 26 permits fluid within the fluid passage to flow out the nozzles 40 and out the access ports 56. Because the access ports 56 are substantially larger than the nozzles 40, debris which is too large to fit through the nozzles of the discharge nozzle section may be removed via the access ports.

To operate the sleeve valve 20, fluid is supplied to the valve via a fluid supply line (not shown), the downstream end of which is attached to the elbow 22. When the gate 26 is in its closed position (FIG. 3), the pan 26, lower sleeve section 34, hollow interior of the gate, and the elbow 22 are all filled with fluid. However, the positions of the seals 80, 82 relative to the sleeve 26 prevents leakage of fluid out the nozzles 40 and access ports 56. To open the valve 20, the actuator is operated to move the gate downwardly either to a throttling position or to the open position (FIG. 4). When the gate 26 is in its open position, fluid is the internal fluid passage flows laterally outwardly through the nozzles 40 in a plurality of jets.

If debris collects on the upper surface of the upper end plate 72 of the gate 26, the gate may be lowered to the clean position in an effort to flush the debris out the access ports 56. If flushing the system in this manner does not remove all the debris, it may be desirable to manually remove the debris. To manually remove the debris, fluid flow into to the fluid supply line is stopped by turning off a valve (not shown) upstream of the fluid supply line. A user then enters the tank and with the gate 26 in its clean position, the user then extracts debris from atop the gate by, for example, reaching his or her hand and arm through one of the access ports, grabbing the debris, and pulling it out through the access port. If the debris is too large to fit through one of the access ports, the user may insert a tool (such as a saw or cutting torch) through the access port and into the fluid passage, break apart the debris with the tool, and then pull the debris out through the access port.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A sleeve valve comprising:

a sleeve having an interior surface defining an internal fluid passage, the sleeve including an intake, a discharge nozzle section, and a clean-out section, the internal fluid passage extending downstream from the intake to at least the discharge nozzle section, the discharge nozzle section including a plurality of nozzles, the sleeve being adapted for fluid flow from the intake through the fluid passage and out the nozzles of the discharge nozzle, the clean-out section including at least one access port;

a gate adapted for sliding within the sleeve in sliding sealing engagement with the interior surface of the sleeve between closed, throttling, open, and clean positions;

the gate and sleeve being configured and adapted so that the gate, when in the closed position, prevents fluid within the fluid passage from flowing out the nozzles and the access port, the gate and sleeve being configured and adapted so that the gate, when in the throttling position, permits fluid within the fluid passage to flow out some of the nozzles but prevents fluid within the fluid passage from flowing out the access port of the clean-out section and others of the nozzles, the gate and sleeve being configured and adapted so that the gate, when in the open position, permits fluid within the fluid passage to flow out the nozzles but prevents fluid within the fluid passage from flowing out the access port of the clean-out section, the gate and sleeve being configured and adapted so that the gate, when in the clean position, permits fluid within the fluid passage to flow out the nozzles and out the access port, the clean-out section being adapted so that debris which is too large to fit through the nozzles of the discharge nozzle section may be removed via the access port of the clean-out section.

2. A sleeve valve as set forth in claim 1 wherein the gate is adapted for sliding within the sleeve along a longitudinal axis between the closed, throttling, open, and clean positions.

3. A sleeve valve as set forth in claim 1 wherein the sleeve extends along a longitudinal axis such that the discharge nozzle section extends along the longitudinal axis a first longitudinal length and such that the clean-out section extends along the longitudinal axis a second longitudinal length.

4. A sleeve valve as set forth in claim 3 wherein the gate is adapted for sliding within the sleeve along the longitudinal axis between the closed, throttling, open, and clean positions, the gate having first and second seal surfaces adapted to sealingly engage the interior surface of the sleeve in sliding sealing engagement all around the circumference of the gate, the first seal surface and the second seal surface being axially spaced from each other a third longitudinal length.

5. A sleeve valve as set forth in claim 4 wherein the discharge nozzle section is generally adjacent the clean-out section, and wherein the third longitudinal length is at least as long as the sum of the first and second longitudinal lengths.

6. A sleeve valve as set forth in claim 5 wherein the gate includes axially opposite first and second ends which are axially spaced from one another, the gate further comprising at least one fluid passageway extending through the gate from the first end to the second end.

7. A sleeve valve as set forth in claim 3 wherein the nozzles are oriented such that fluid flowing out the nozzles flows generally laterally relative to the longitudinal axis.

8. A sleeve valve as set forth in claim 7 wherein each nozzle includes an inlet, an outlet, and a nozzle passageway extending from the inlet to the outlet, the nozzle passageway diverging generally from the inlet to the outlet.

9. A sleeve valve as set forth in claim 8 wherein the outlet of each nozzle is less than approximately three square inches.

10. A sleeve valve as set forth in claim 9 wherein the access port of the clean-out section is sufficiently large to enable a user to insert a hand of the user into access port.

11. A sleeve valve as set forth in claim 3 wherein the access port is shaped and adapted so that fluid flowing out the access port flows generally laterally relative to the longitudinal axis.

12. A sleeve valve as set forth in claim 11 wherein the access port is shaped and adapted so that fluid flowing out the access port is diverted in a manner which causes a torsional load on the sleeve.

13. A sleeve valve as set forth in claim 1 wherein the throttling position comprises one of a plurality of throttling positions between the closed and open positions.

14. A sleeve valve as set forth in claim 1 wherein each nozzle includes an inlet, an outlet, and a nozzle passageway extending from the inlet to the outlet, the outlet of each nozzle being less than approximately three square inches.

15. A sleeve valve as set forth in claim 14 wherein the access port of the clean-out section is sufficiently large to enable a user to insert a hand of the user into access port.

16. A method comprising:

providing a sleeve valve comprising a sleeve and a gate, the sleeve having an interior surface defining an internal fluid passage, the sleeve including an intake, a discharge nozzle section, and a clean-out section, the internal fluid passage extending downstream from the intake to at least the discharge nozzle section, the discharge nozzle section including a plurality of nozzles, the sleeve being adapted for fluid flow from the intake through the fluid passage and out the nozzles of the discharge nozzle, the clean-out section including at least one access port, the gate being adapted for sliding within the sleeve in sliding sealing engagement with the interior surface of the sleeve between closed, throttling, open, and clean positions, the gate and sleeve being configured and adapted so that the gate, when in the closed position, prevents fluid within the fluid passage from flowing out the nozzles and the access port, the gate and sleeve being configured and adapted so that the gate, when in the throttling position, permits fluid within the fluid passage to flow out some of the nozzles but prevents fluid within the fluid passage from flowing out the access port of the clean-out section and others of the nozzles, the gate and sleeve being configured and adapted so that the gate, when in the open position, permits fluid within the fluid passage to flow out the nozzles but prevents fluid within, the fluid passage from flowing out the access port of the clean-out section, the gate and sleeve being configured and adapted so that the gate, when in the clean position, permits fluid within the fluid passage to flow out the nozzles and out the access port;

moving the gate to the clean position to permit fluid to flow through the access port of the clean out section in a manner to flush debris which is too large to fit through the nozzles of the discharge nozzle section out the access port.

17. A method as set forth in claim 16 further comprising:

stopping fluid flow into the intake of the sleeve to prevent fluid from flowing from the fluid passage out the access port of the clean-out section even when the gate is in the clean position;

while the gate in the clean position, extracting debris, which is adjacent the gate, out the access port.

18. A method as set forth in claim 17 wherein the step of extracting debris comprises:

inserting a tool through the access port and into the fluid passage;

operating the tool to break up the debris;

pulling the debris out through the access port.

19. A method comprising:

providing a sleeve valve comprising a sleeve and a gate, the sleeve having an interior surface defining an internal fluid passage, the sleeve including an intake, a discharge nozzle section, and a clean-out section, the internal fluid passage extending downstream from the intake to at least the discharge nozzle section, the discharge nozzle section including a plurality of nozzles, the sleeve being adapted for fluid flow from the intake through the fluid passage and out the nozzles of the discharge nozzle, the clean-out section including at least one access port, the gate being adapted for sliding within the sleeve in sliding sealing engagement with the interior surface of the sleeve between closed, throttling, open, and clean positions, the gate and sleeve being configured and adapted so that the gate, when in the closed position, prevents fluid within the fluid passage from flowing out the nozzles and the access port, the gate and sleeve being configured and adapted so that the gate, when in the throttling position, permits fluid within the fluid passage to flow out some of the nozzles but prevents fluid within the fluid passage from flowing out the access port of the clean-out section and others of the nozzles, the gate and sleeve being configured and adapted so that the gate, when in the open position, permits fluid within the fluid passage to flow out the nozzles but prevents fluid within the fluid passage from flowing out the access port of the clean-out section, the gate and sleeve being configured and adapted so that the gate, when in the clean position, permits fluid within the fluid passage to flow out the nozzles and out the access port;

stopping fluid flow into the intake of the sleeve to prevent fluid from flowing from the fluid passage out the access port of the clean-out section even when the gate is in the clean position;

moving the gate to the clean position;

extracting debris, which is adjacent the gate, out the access port.

20. A method as set forth in claim 19 wherein the step of extracting debris comprises:

inserting a tool through the access port and into the fluid passage;

operating the tool to break up the debris;

pulling the debris out through the access port.

21. A sleeve valve comprising:

a sleeve having an interior surface defining an internal fluid passage, the sleeve including an intake, a discharge nozzle section, and a clean-out section, the internal fluid passage extending downstream from the intake to at least the discharge nozzle section, the discharge nozzle section including a plurality of nozzles, the sleeve being adapted for fluid flow from the intake through the fluid passage and out the nozzles of the discharge nozzle section, the clean-out section including at least one access port, the access port of the clean-out section being larger than any of the nozzles of the discharge nozzle section;

a gate adapted for sliding within the sleeve in sliding sealing engagement with the interior surface of the sleeve between closed, throttling, open, and clean positions;

the gate and sleeve being configured and adapted so that the gate, when in the closed position, prevents fluid within the fluid passage from flowing out the nozzles and the access port, the gate and sleeve being configured and adapted so that the gate, when in the throttling position, permits fluid within the fluid passage to flow out some of the nozzles but prevents fluid within the fluid passage from flowing out the access port of the clean-out section and others of the nozzles, the gate and sleeve being configured and adapted so that the gate, when in the open position, permits fluid within the fluid passage to flow out the nozzles but prevents fluid within the fluid passage from flowing out the access port of the clean-out section, the gate and sleeve being configured and adapted so that the gate, when in the clean position, permits fluid within the fluid passage to flow out the access port.

* * * * *